Sept. 20, 1966  C. GARRIS  3,273,486
APPARATUS FOR RETAINING AND PROCESSING DENTAL X-RAY FILMS
Filed Jan. 10, 1964  3 Sheets-Sheet 1

CHARLES GARRIS
INVENTOR.

BY
ATTORNEY

Sept. 20, 1966  C. GARRIS  3,273,486
APPARATUS FOR RETAINING AND PROCESSING DENTAL X-RAY FILMS
Filed Jan. 10, 1964  3 Sheets-Sheet 2

CHARLES GARRIS
INVENTOR.

BY
ATTORNEY

United States Patent Office 3,273,486
Patented Sept. 20, 1966

3,273,486
APPARATUS FOR RETAINING AND PROCESSING DENTAL X-RAY FILMS
Charles Garris, 37—03 Little Neck Parkway, Little Neck, N.Y.
Filed Jan. 10, 1964, Ser. No. 336,967
8 Claims. (Cl. 95—98)

This invention relates to dental X-ray films and is particularly directed to a combination apparatus for retaining the films during the process of developing, and otherwise processing the films, spacing and locating the films relative to one another, in combination with portions of the apparatus which contain the fluids used for various steps in the processing thereof, from the time the film is exposed until the processing is completed.

It is primarily directed to a combination of various portions of the apparatus, one of which is used for gripping and retaining the films in a proper position relative to one another, so as to avoid any interference between adjoining films, positively gripping the films during the processing thereof, spacing the films relative to one another in such a manner as to hold and support as many films as is reasonably practical in a specific area, and still allow the films to be exposed to the solutions used as fully as possible, with a minimum of interference, the spacing apparatus including a retainer rack, a spacer holder, which restricts the passage of light to the films already in the retainer rack, space being provided so that the developing, or other solutions can be added while the films are protected from direct exposure to the light, an additional container being provided for retaining the solutions required for developing, and otherwise processing the films, the container or tank supporting the film retainer rack, and the spacer holder, a cover being provided for the container or tank, so that the entire combination can be kept in a dimly lighted room, the films being completely protected from direct exposure to the light.

A primary object of the invention is to provide a combination retainer and film processing apparatus, which will support and process a relatively large number of films, thereby reducing the time required for loading and developing and otherwise processing the film to a minimum.

Another object is to provide a retaining and processing apparatus which will support and develop a relatively large number of films, the films being held flat and relatively uniformly spaced relative to one another, thereby reducing the time required and the solution cost of the developing and otherwise processing the films to a minimum.

A primary feature of the invention is that the films are supported in the retainer rack by a plurality of tension springs which are so constructed and located that they uniformly grip the edges of the films in such a manner as to positively grip the films while reducing the portion of the films which are actually gripped by the springs and therefore not exposed to the developing and other processing solutions to a minimum.

Another feature is that a combination spacer holder and light shield is provided in conjunction with the retainer rack to enable the films to be progressively and uniformly loaded in the retainer rack, thereby maintaining substantially equal and uniform spacing between adjoining films, means being provided for facilitating the pouring of the developing solutions into the container or tank in which the retainer rack is placed, so as to uniformly cover the films with the developing solution, while protecting the films from exposure to the light.

Another feature is that a container is provided for supporting the film retainer rack and the spacer holder used in conjunction with the retainer rack, the container being large enough to hold enough developing and other processing solutions to completely cover the films, a cover being provided in conjunction with the container to completely protect the container and the films mounted within the retainer rack from the light, so that the films can be held in the developing, or other processing solutions for the required length of time without damage or injury to the films.

A major feature of the invention is that three edges of each of the films are gripped and supported by the springs in the retainer rack, which are tensioned in such a manner that they positively grip the films regardless of the number of films to be processed at any one time, space being provided within the retainer rack to allow the developing or other processing solutions to flow uniformly through the retainer rack, thereby uniformly covering all surfaces of the films during the developing process.

Another feature of the apparatus is that a combination of light barriers is provided, these including the walls of the retainer rack proper, the walls of the spacer holder, which protect all of the films except the one being loaded during the loading process, and the container or tank for supporting the processing fluids, the container having a cover fitted thereto, the cover completely insulating the entire unit from direct exposure to the light.

Another feature is that the entire apparatus is so constructed that the films can be loaded in the retainer rack by a relatively unskilled operator, without tools of any kind, all other parts of the apparatus being relatively easy to manipulate.

Because the individual springs in the retainer rack, are of relatively small diameter, and formed of relatively fine wire, and as a portion of each spring is held in a channel cut into the adjacent wall or bottom panel of the retainer rack, the exposed portions of the coils of the springs, which actually project beyond the inner surfaces of the walls and which actually cover the individual film during the developing process and other phases of the processing are very small so that the areas of the individual films which are not fully exposed to the developing solution and other processing solutions are so small as to be relatively negligible, thereby reducing the defective portions of the films to a minimum.

Another feature is that ample passage areas is provided between the end of the spacer holder projecting beyond the retainer rack and the interior of the container or tank, to allow the developing and other processing solutions to flow freely when poured into the container or tank, whereby uniformly covering all of the films in the retainer rack with a uniform solution.

The accompanying drawings, illustrative of one embodiment of the invention, together with the description of its construction and the method of operation, mounting, assembly and utilization thereof, as well as the interrelation between the various components of the assembled apparatus, will serve to clarify further objects and advantages of the invention.

It will be understood that the following description of the construction and the method of support, assembly and operation of the apparatus for retaining and processing dental X-ray films is intended as explanatory of the invention and not restrictive thereof.

In the drawings, the same reference numerals designate the same parts throughout the various views, except where otherwise indicated.

Figure 1:
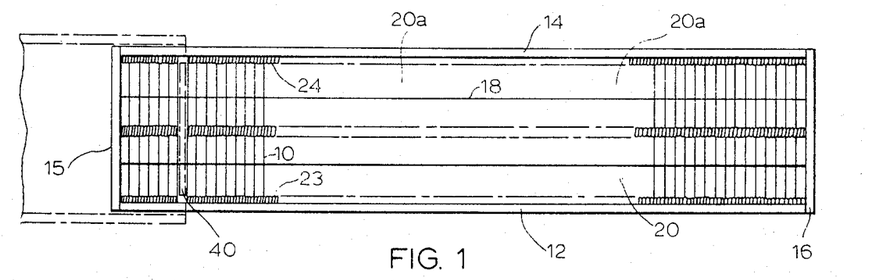
FIG. 1 is a plan view of the film retainer rack, showing the tension springs fitted to the channels in the walls of the retainer rack and a plurality of X-ray films supported by the springs, also showing the spacer panel of the spacer holder located bewteen an adjoining pair of films in dot-dash lines.
Figure 2:
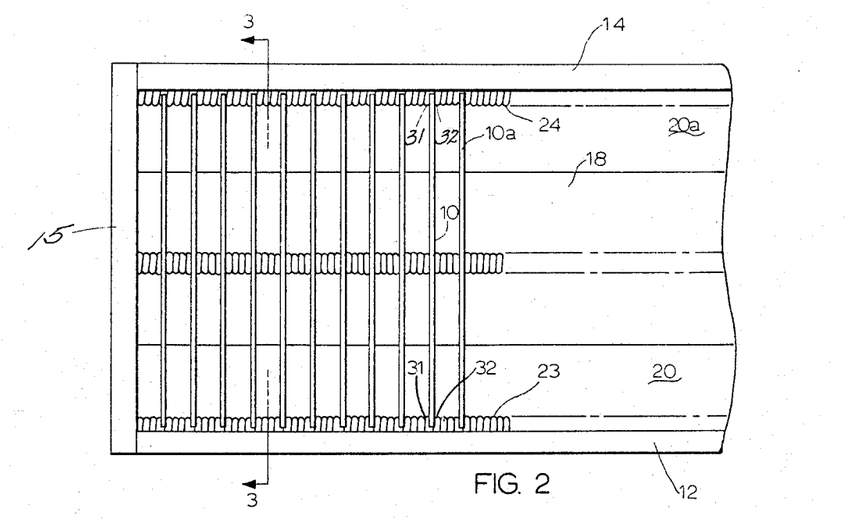
FIG. 2 is an enlarged plan view of a portion of the film retainer rack, shown in FIG. 1, showing the front and rear walls, the bottom panel, the tension springs fitted to the channels formed in the front and rear walls and the bottom panel, respectively, and a plurality of films inserted between the front and rear walls and supported by the coils of the springs.
Figure 3:
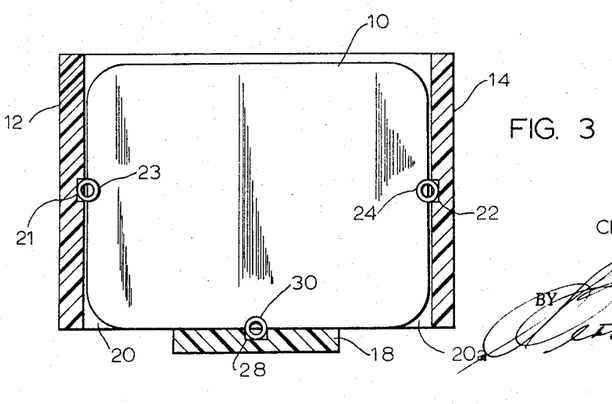
FIG. 3 is an enlarged cross-section through the film retainer rack, shown in FIG. 2, showing the front and rear walls, the bottom panel, the coiled tension springs inserted in the channels cut into the front and rear walls and the bototm panel, respectively, also showing the relative position of one of the X-ray films relative to the walls of the retainer rack, and the bottom panel, respectively, the section being taken on the line 3—3, FIG. 2.

One embodiment of the construction shown in FIGS. 1, 2 and 3, shows a retainer rack, which is used for supporting a plurality of dental X-ray films 10, during the processing of developing, and otherwise processing the films.

The rack is formed of a plurality of walls, each of which is made of a plastic sheet material, such as a phenolic sheet, which must be fairly rigid and opaque so that light will not pass through the walls during the developing or other phase of the process, or at any other time.

The material of which the walls of the retainer rack is made must also be corrosion resistant, so it will not be attacked by, or have any effect on the solutions used for developing, or otherwise processing the films.

In fact the walls can be made of metal, such as stainless steel, or other corrosion resistance material, the end walls being welded, brazed, or otherwise fixedly attached to the front and rear wall and the bottom panel.

The retainer rack includes a front and a rear wall 12, 14, which are spacedly located relative to one another and parallel to one another, the spacing between the front and rear walls being somewhat wider than the X-ray films, to allow the films to be readily inserted between the walls.

A pair of end walls 15, 16 is attached to the ends of the front and rear walls by gluing, tongue and groove joints, or other suitable connecting means, to form a fairly rigid retainer.

A bottom panel 18, which is formed of substantially the same sheet material as the front and rear walls is attached to the bottom of the end walls. The bottom panel, the ends of which are attached to the bottom of the end walls by gluing or other suitable attaching means, is narrower than the spacing between the front and rear walls 12, 14, a pair of spaces 20, 20a, being provided between the bottom panel and the front and rear walls to allow the developing solution or other solution to pass therethrough during the developing process hereinafter described in detail.

As shown in FIG. 2, the height of the front and rear walls, is higher than the individual films to allow for any misalignment in the films and to provide room for a spacer panel, which is shown in FIG. 1 and hereinafter described.

As shown in FIG. 2, a channel 21, 22 of rectangular, or other suitable cross-section is cut through the inner surface of the front and rear walls, the depth of the channels being determined by the diameter of a pair of coiled tension springs 23, 24, one of which is fitted to each of the channels in the manner shown in FIG. 2, and hereinafter described in detail.

Figure 9:
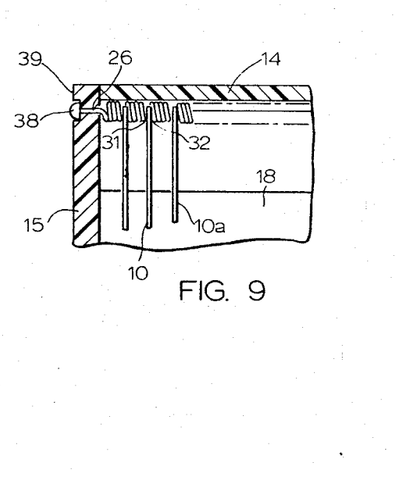
FIG. 9 is an enlarged longitudinal section through a portion of one end of the retainer rack, shown in FIGS. 1 and 2, showing the method of attaching one end of one of the tension springs to one end wall of the retainer rack.

Each of the coiled tension springs, which is fitted to each of the channels 21, 22 is formed of relatively fine wire, closely wound, each of the springs having a pair of ends 26, 27 integral therewithin the manner shown in FIG. 9.

The outer diameter of the spring is relatively small, of the order of about $5/32$ inch, the depth of each channel being about one-half the diameter of the spring, so that the portion of the spring which actually covers the film, when the film is inserted between the springs in the manner shown in FIG. 2, is relatively small, thus holding the area of the film, which is not exposed to the developing solution, and therefore the defective area of the film to a minimum.

As shown in FIG. 2, a corresponding channel 28, is cut into the upper surface of the bottom panel 18, a coiled tension spring 30, similar to those fitted to the front and rear walls, being inserted in the channel 28.

The lower spring 30 is of substantially the same diameter as the springs 23, 24, fitted to the front and rear walls, the spring projecting beyond the upper surface of the bottom panel, over substantially the same distance, so that the portion of the spring which covers the film and prevents the developing fluid from reaching the film is held to a minimum.

When the springs are inserted in the channels in the front and rear walls and the bottom panel, they are adjusted to an initial tension, which may be experimentally determined, the spacing between the adjoining coils 31, 32 being less than the thickness of the individual X-ray film, so that when the films are inserted between the adjoining coils they are held by the pressure of the adjoining coils against the surfaces of the individual film, thus positively gripping the films 10, 10a and retaining them in their relative positions shown in FIGS. 1 and 2.

In place of the single spring 23, 24 in each of the front and rear walls, as shown in FIG. 2, two or more springs may be fitted to each of the front and rear walls, each of the springs being inserted in an individual channel, so that the springs are spaced relative to one another, or two springs may be inserted in a single channel which is wider than those shown in FIG. 2, so that each channel will hold a plurality of springs.

Figure 10:
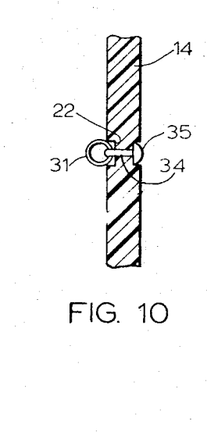
FIG. 10 is an enlarged section through a portion of the rear wall of the film retainer rack, shown in FIGS. 1 and 2, showing the method of attaching the tension springs to the front and rear walls of the film retainer rack.

In order to retain the springs in their proper position relative to the front and rear walls 12, 14 and the bottom panel, individual coils 31, located in spaced positions relative to the front and rear walls are attached to the front and rear walls and the bottom panel in the manner shown in FIGS. 9 and 10.

A loop 34 formed of fine wire, or thread is wrapped around one of the coils 31 of the spring, the ends of the loop passing through one or more openings through the adjacent wall of the retainer rack.

A soldered joint 35 such as that shown in FIG. 10, may be provided to connect the ends of the loop 34, when the loop is formed of wire, thereby attaching the loop to the wall of the retainer rack, and gripping a portion of the spring 23, 24.

The number of loops used with each individual spring, would depend upon the length of the individual spring and the number of coils in the individual spring.

In place of the soldered connection, the ends of the loop may be wound around one another, where the loops are made of wire, or the ends of the loop may be tied to one another, where the individual loops are formed of threads, or other suitable means to form a positive connection which grips the individual coil and holds it in place against the bottom of the channel 21, 22.

After the spring is inserted in the channel in the front or rear wall of the retainer rack, one end 27 of the spring is inserted through an opening in one end wall of the rack, the outer end of the spring end being attached to the end wall by a soldered joint or other suitable attaching means.

After the first end of the spring is attached to one end wall of the retainer rack, the opposite end 26 of the spring is inserted through an opening in the opposite end wall in the manner shown in FIG. 9. The end 26 of the spring is drawn through the opening in the end wall, until the proper spring tension is obtained, after which a soldered joint 38, or other suitable joint is formed at the end of the spring, a countersink 39 being provided in the outer surface of the end wall of the retainer rack to reduce the projection of the outer edge of the soldered joint beyond the outer surface of the end wall 15, 16 to a minimum.

Figures 4, 12:
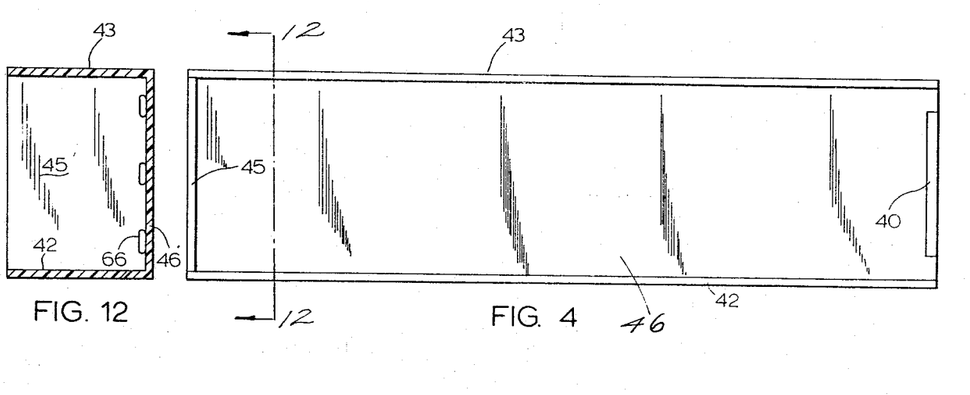
FIG. 4 is a bottom plan view of the spacer holder shown in FIG. 1, and the spacer panel located at one end of the spacer holder, which supports the spacer panel.
FIG. 12 is a cross-section through the spacer holder, showing the left-hand end wall of the spacer holder, shown in FIGS. 4 and 5, the end wall having a plurality of openings therethrough to allow pocketed air in the developing or other solutions to escape, the section being taken on the line 12—12, FIG. 4.

After the springs are inserted in the retainer rack, a spacer holder, such as that shown in FIG. 4 is fitted to one end of the rack, the left-hand end shown in FIG. 1, the spacer panel 40 located at one end of the spacer holder, being fitted to the interior of the rack, between the springs 23, 24.

Before the spacer panel is inserted in the retainer rack in the relative position shown in FIG. 1, a single film 10 may be manually inserted between adjacent coils of the springs 23, 24, 30.

The thickness of the spacer panel 40 is equal to or somewhat less than the spacing between adjoining films 10, 10a in the mounted position shown in FIG. 2.

With the spacer holder in position so that the left-hand end of the spacer panel is located adjacent the first film, or the end wall 15, a film 10, is inserted between the springs adjacent the outer surface of the spacer panel 40. The film is gripped and held in place by adjoining coils of the springs 23, 24, 30. After the first film is inserted, the spacer holder is lifted and the spacer panel reinserted in the retainer rack, in a position in which the left-hand surface of the spacer panel, engages the surface of the film inserted in the retainer rack.

Another film is then inserted in the retainer rack adjacent the outer surface of the spacer panel. This operation is repeated until the spacer panel reaches a position close to the right hand end wall of the retainer rack, or until the required number of films is inserted in the retainer rack.

Figure 6:
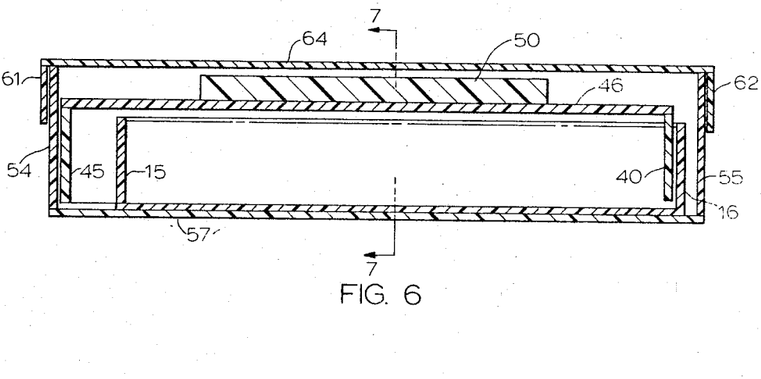
FIG. 6 is a longitudinal section through the assembled components of the apparatus, inserted in the fluid container or tank, showing the film retainer rack, the spacer holder fitted to one end of the film retainer rack, and a cover fitted to the upper end of the container or tank.

When the last film is inserted in the retainer rack, the spacer holder is moved to the end position shown in FIG. 6. The top wall and the side walls of the spacer holder are opaque and light proof so that the films are protected from the light while the spacer holder is held in this position relative to the films supported by the retainer rack.

The entire film loading operation can be conducted in a dark room, or the operator can determine the position of the individual films within the retainer rack by touching the outer surface of the spacer panel, no visual inspection being necessary.

The usual red or diffused light, which is available in dark rooms may however be used so the operator can generally locate the objects around him, the films while in the retainer rack being protected by the walls of the spacer holder, so that no light reaches the films located under the spacer holder.

Figure 8:
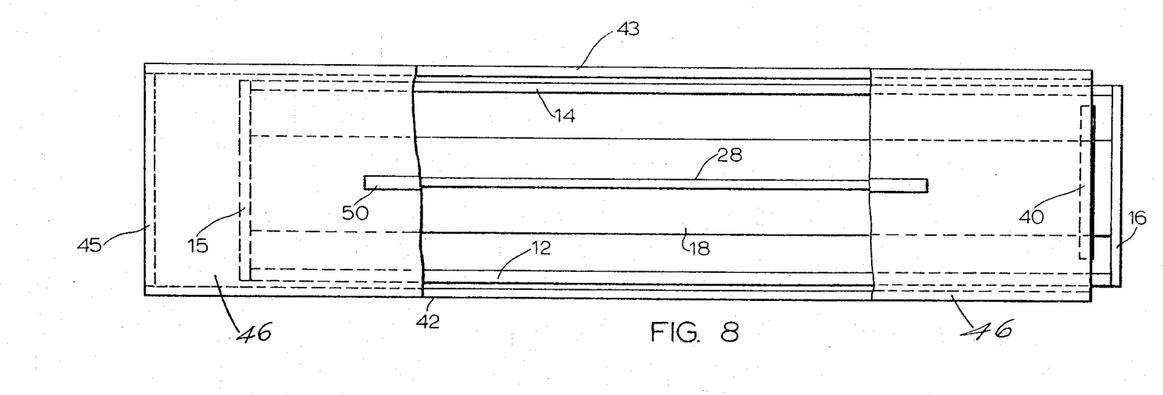
FIG. 8 is a plan view of the retainer rack shown in FIG. 1, with the spacer holder fitted to the interior of the retainer rack, the spacer panel being located adjacent one end wall of the retainer rack.

As shown in FIG. 8, the upper surface of the spacer holder is solid and opaque so that all films located inside the retainer rack are protected from the light, and may be handled in a room with a diffused light in preparation for the developing process, which is hereinafter described in greater detail.

Figure 5:
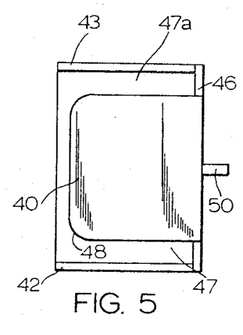
FIG. 5 is a side elevational view of the spacer holder, shown in FIG. 4, showing the spacer panel supported by the top wall of the spacer holder.

The spacer holder shown in FIGS. 4 and 5, comprises a front wall 42 and a rear wall 43, the front and rear walls being parallel to and spacedly located relative to one another. The spacing between the inner surfaces of the front and rear walls is somewhat greater than the spacing between the outer surfaces of the front and rear walls 12, 14 of the retainer rack to enable the spacer holder to be fitted to the retainer rack in the position shown in FIGS. 1 and 6.

An end wall 45 is attached to the left-hand end of the front and rear walls by gluing, a tongue and grooved joint or other suitable attaching means.

A top wall 46 extends across the front and rear walls and the end wall 45, the top wall being attached to the front and rear walls and the left-hand end wall 45 by gluing, or other suitable attaching means.

The spacer panel 40 is attached to the right hand-end of the top wall 46 by gluing or other suitable attaching means, the spacer panel extending downward from the top wall to a point above the bottom edge of the front and rear walls to enable the spacer panel to clear the spring 30 fitted to the bottom panel of the retainer rack.

Figure 7:
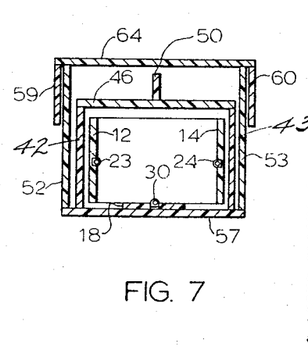
FIG. 7 is a cross-section through the assembled components of the assembled apparatus, shown in FIG. 6, inserted in the fluid container or tank, showing the spacer panel fitted to the retainer rack, the section being taken on the line 7—7, FIG. 6.

The width of the spacer panel is less than the spacing between the front and rear walls 42, 43 to provide a pair of spaces 47, 47a at both sides of the spacer panel to allow the developing solution to flow through between the spacer panel and the front and rear walls in the assembled position shown in FIG. 7.

The bottom edges of the spacer panel are rounded 48, to avoid injury to the surfaces of the films.

The height of the front wall, the rear wall and the end wall 45 is greater than that of the front and rear walls of the retainer rack, so that the top wall 46 of the spacer holder clears the top of the retainer rack in the assembled position shown in FIG. 6.

A thin rectanguar strip 50 is attached to the upper edge of the top wall to provide means for gripping the spacer holder and moving it from one position to another in the manner shown in FIGS. 1 and 6 and hereinbefore described.

The thickness of the spacer panel 40 is equal to or slightly less than the spacing between adjoining films in the position shown in FIGS. 1 and 6 and hereinbefore described.

The walls of the spacer holder are made of a plastic material, such as a phenolic material which is opaque and impervious to light, so the films are protected from the light when the spacer holder is mounted in the position shown in FIGS. 1 and 6.

The walls of the spacer holder must also be made of a material which is corrosion resistant and will not be acted upon by the developing solution, or other processing solutions when the spacer holder is located in the assembled position shown in FIG. 6.

The spacer holder may also be formed of stainless steel sheet or other corrosion resistant metal, which will not be acted upon by the developing solution or other solutions used in the processing of the film.

After the films are placed in the retainer rack, the retainer rack, with the spacer panel fitted thereto, the spacer holder extending over the top of the retainer rack, is placed in a container or tank, such as that shown in FIGS. 6 and 7.

The container or tank is a hollow container of rectangular cross-section, the top being open.

The container or tank includes a front and rear wall 52, 53, and a pair of end walls 54, 55, fixedly attached by a suitable adhesive, a tongue and groove joint or other suitable attaching means to the ends of the front and rear walls.

The front and rear walls are parallel and spacedly located relative to one another, the inner spacing between the front and rear walls being greater than the distance between the outer surfaces of the front and rear walls of the spacer holder to enable the retainer rack and the spacer holder to be inserted through the open top of the container or tank, in the relative positions shown in FIG. 7.

The end walls 54, 55 of the container are also parallel to one another, the longitudinal spacing between the end walls being greater than the distance between the outer surfaces of the left-hand end wall and the spacer panel, or the distance between the outer surface of the left-hand end wall of the spacer holder, and the right-hand end wall of the retainer rack, thus providing a space between the right-hand end wall of the retainer rack and the corresponding end wall of the container.

A bottom wall 57 is attached to the bottom of the front and rear walls and the end walls of the container or tank, by a suitable adhesive, or other suitable attaching means.

The junction between the bottom of the front and rear walls and the bottom wall of the container or tank after the bottom wall is attached to the vertical walls of the container, is sealed by a suitable sealing compound to prevent any leaks of the developing solution at the junction between the bottom of the vertical walls 52, 53, 54, 55 and the bottom wall.

In the same manner, the junction between the front and rear walls and the end walls of the container or tank, are sealed by a suitable sealing compound after they are attached to one another, in order to prevent any leaks of the developing solution through the joints.

The entire container would be tested after the walls are assembled to one another to assure that all the joints are leak proof, thus preventing the leakage of any fluid through the joints when the container is filled with developing solution, or other liquids used in the processing of the films.

The front and rear walls and the end wall of the container, or tank are made of a sheet plastic material such as a phenolic sheet material which is opaque, and leak proof. The material is also corrosion resistant so that the walls will not react with, or contaminate in any manner, the developing solution poured into the container, or any of the other solutions used in the processing of the films supported by the retainer rack.

The bottom wall 57 of the container, or the tank is also made of a similar plastic material, which is attached to the bottom surfaces of the vertical walls in such a manner as to provide a leak-proof joint between the bottom of the vertical walls and the bottom wall.

Instead of a plastic material, the front and rear walls 52, 53, the end walls 54, 55 and the bottom wall of the container or tank may be made of a corrosion resistant metal, such as corrosion resistant steel.

Where corrosion resistant steel is used, the front and rear walls may be attached to the end walls by welding, brazing, or other suitable attaching means. The bottom wall 57 would also be attached to the bottom surface of the front and rear walls and the end walls by welding, brazing, or other suitable attaching means, thus providing leakproof joints between the front and rear walls and the end walls, and also between the bottom wall and the adjoining edges of the front and rear walls and the end walls.

Should any minor leaks develop at any of the joints, a suitable sealing compound may be applied to the inner surfaces of the junction between the front and rear walls and the end walls, and the junction between the front, rear and end walls and the bottom wall to seal the joints and prevent the flow of liquids therethrough.

A developing solution of a predetermined composition is poured into the open top of the container, or tank, the developing solution filling the container, or tank to a level above the upper edge of the X-Ray films supported by the retainer rack.

The space between the front and rear walls of the spacer holder and the spacer panel allows the developing solution to flow into the retainer rack, the films being completely immersed in the developing solution.

As the bottom panel of the retainer rack is considerably narrower than the spacing between the front and rear walls of the retainer rack, the space between the bottom panel and the front and rear walls of the retainer rack, and the space between the bottom of the bottom panel and the bottom of the front and rear walls of the retainer rack, allow the fluid to flow longitudinally alongside the bottom of the retainer rack, the fluid reaching and completely immersing all of the films supported by the retainer rack.

As the level of the developing solution in the container or tank, is higher than the top of the films in the retainer rack, a portion of the solution can flow over the top of the films. The solution completely covering and immersing all of the films in the retainer rack, thereby exposing all of the films to the effects of the developing solution.

Air pocketed in the developing solution can escape through the two spaces 47, 47a between the spacer panel and the front and rear walls of the spacer holder.

If necessary, small additional holes can be provided in the left-hand end wall of the spacer holder, to allow pocketed air to escape.

After the developing solution is poured into the container or tank, the container may be manually rocked slightly in order to remove any excess air from the solution.

In order to allow time for the developing solution to perform its necessary function on the films, a cover is placed over the top of the container or tank in the manner shown in FIGS. 6 and 7.

The cover is completely opaque and light resistant so that the container with the cover fitted thereto can be left in a room exposed to a moderate amount of light for a sustained period without affecting the films.

The cover is of open rectangular cross-section, the cover fitting over the top of the container or tank in the manner shown in FIGS. 6 and 7.

The cover comprises a front and a rear wall 59, 60, and a pair of end walls 61, 62, fixedly attached by a suitable adhesive, a tongue and groove joint, or other suitable attaching means to the ends of the front and rear walls.

The front and rear walls are parallel to one another and spacedly located relative to one another, the spacing between the front and rear walls being slightly greater than the spacing between the outer surfaces of the front and rear walls of the container or tank, to enable the cover to fit over the top of the container in the manner shown in FIG. 7.

The end walls 61, 62 of the cover are also parallel to one another, the longitudinal spacing between the inner surfaces of the end walls being slightly greater than the spacing between the outer surfaces of the end walls of the container, thus allowing the cover to fit over the open top of the container in the manner shown in FIG. 6.

A top wall 64 is attached to the upper edge of the front and rear walls 59, 60 and the end walls 61, 62 of the cover by means of a suitable adhesive, or other suitable attaching means.

The top wall of the cover may be flush with the front and rear walls and the end walls, or extend beyond the outer surfaces of the front and rear walls and the end walls, depending upon the requirements of a particular installation.

The front and rear walls and the end walls of the cover are made of a sheet plastic material, similar to that used for the container proper. The material of which the cover is made is also opaque, so that it will not allow light to pass therethrough to the films supported by the retainer rack.

The top wall of the cover is also made of a plastic sheet material, having the same general characteristics as that of which the front, rear and end walls are made.

It is particularly vital that the material of which the cover is made be opaque so that it will not allow light to pass therethrough to the films supported by the retainer rack.

The material of which the walls of the cover is made must also be corrosion resistant, so that it will not react with, or contaminate in any manner the developing solution filling the container, or tank, or any of the other solutions used in the processing of the X-ray films.

The top wall 64 of the cover is made of a similar material. It is of particular importance that the top wall of the cover be opaque, in order to protect the films located within the retainer rack, from the light during the developing process.

Instead of a plastic material, the front and rear walls, the end walls, and the top wall of the cover may be made of a corrosion resistant metal, such as corrosion resistant steel.

Where corrosion resistant steel is used for the walls of the cover, the front and rear walls may be attached to the end walls by welding, brazing or other suitable attaching means. The top wall 64 would also be attached to the front and rear walls and the end walls by welding, brazing, or other suitable attaching means.

When the springs 23, 24 are fitted to the channels in the front and rear walls 12, 14, and the bottom panel 18 of the retainer rack, they are adjusted to a predetermined initial tension, the gap between adjoining coils of each spring being less than the thickness of one of the X-ray films.

When a film is inserted between a pair of coils of the springs, the spacing between the coils is increased to some extent, thereby increasing the pressure between the coils of the spring and the surfaces of the film, thus positively gripping the film, and holding it in its proper position relative to the adjoining films.

The spacing between the films is determined by the thickness of the spacer panel of the spacer holder.

Due to the fact that the springs are made of very fine wire, there are a number of coils in each spring between each pair of films.

These coils between each pair of films absorb the increase in spacing between adjoining coils, at the point at which the individual film is inserted, so that very little coil displacement is transmitted to the next film. In this manner, the pressure of the coils of the springs against the faces of the films is relatively uniform over the entire length of the individual springs.

In this manner, the force required in inserting a film between the coils of the springs at one end of the retainer rack is substantially the same as that required in inserting a film in any other portion of the springs.

While there may be a slight increase in spring pressure, as the number of films is increased, this will not be increased to a point which will damage the films to any serious extent.

If the pressure by the coils against the films is increased to any serious extent, the initial tension of the springs can be readjusted, thus reducing the excessive pressure against the surfaces of the individual films.

The individual films are thus gripped by the coils of the springs at three strategic points on the edges of the film which face the front and rear walls of the retainer rack and at the bottom edge of the individual film.

Due to the position of the spacer panel 40 when the individual films are inserted between the coils of the springs, the films are substantially perpendicular to the front and rear walls of the retainer rack and the bottom panel thereof.

In place of the single spring fitted to each of the front and rear walls of the retainer rack, as shown in FIG. 2, two or more springs may be fitted to each of the front and rear walls, thus increasing the pressure of the coils of the springs against the surfaces of the individual films. The additional springs may each be fitted to a separate channel cut into the front or rear wall of the retainer rack, or a wider channel may be provided to accommodate two or more springs in each channel.

Where more than one spring is fitted to a single channel, some space would be provided between adjoining springs, to avoid the possibility of tangling of coils, or any interference between the coils of one spring and those of the adjoining spring.

In the same manner, two or more springs may be fitted to the bottom panel of the retainer rack.

Here again, a separate channel would be provided to receive each spring, or two or more springs could be located in one wide channel, the width of the channel being increased to provide a space between each pair of adjoining springs.

In the retainer rack hereinbefore described, the individual films are located closer together than in the conventional holding method, so that more films can be developed in the same overall area.

In the same manner, the individual films are supported and located in such a manner that the possibility of interference between adjoining films is reduced to a minimum, thus reducing the possibility of damage or injury to adjoining films.

The spacing between adjoining films in the retainer rack may be varied by varying the thickness of the spacer panel.

Care must however be exercised in reducing the spacing between adjoining films to avoid the possibility of the films touching one another, and also to allow enough spring coils between adjoining films to avoid too large an increase in pressure between the coils of the springs and the individual films, as the number of films supported by the retainer rack is increased.

As the films are necessarily loaded in a darkroom, it would be extremely difficult to locate the films relatively close together manually in a dark room, or even a dark room fitted with a diffused light.

By using a spacer panel, the spacing between adjoining films is accurately adjusted and the location of the individual film relative to the walls of the retainer rack accurately held.

By making the spacer panel an integral part of the spacer holder, or box, which fits over the walls of the retainer rack, the individual films can be inserted in their proper position relative to one another, almost entirely by sense of touch, so that almost no light is necessary, the diffused light of the dark room providing adequate illumination, so that the operator can readily determine if anything goes wrong, or if any of the films are distorted for any reason.

The position of the front and rear walls of the spacer holder relative to the corresponding front and rear walls of the retainer rack enables the operator to move the spacer holder along, as the films are loaded into the retainer rack, by locating the spacer panel from the adjoining film in the retainer rack, entirely by touch without actually seeing the films.

The actual movement of the spacer holder, during the loading of the retainer rack in complete darkness is substantially as follows:

The retainer rack is located on a table and held by one hand of the operator, the right-hand.

The spacer holder is lifted by the left-hand of the operator and the spacer panel inserted into the retainer rack in a position similar to that shown in FIG. 1.

The spacer holder is moved leftward until the spacer panel reaches the left-hand end wall of the retainer rack.

The first X-ray film is inserted in the retainer rack by locating the film from the right-hand face of the spacer panel, the film being slid downward between the coils of the springs, until it reaches the position shown in FIG. 3, the bottom of the film reaching the upper surface of the bottom panel of the retainer rack.

The spacer holder is then raised until the spacer panel reaches the upper edge of the film, after which it is lifted over the film and moved into the retainer rack until the left-hand face of the spacer panel touches the adjoining face of the film.

Another film is inserted adjacent the right-hand face of the spacer panel, the film being moved downward until it reaches the top of the bottom panel of the retainer rack.

This operation is repeated until the retainer rack is fully loaded, the spacer panel being located close to the right-hand end wall of the retainer rack.

The retainer rack can thus be loaded with films in a dark room, without any light whatever, although a diffused light can be used, if advisable, without affecting the films in any manner.

The apparatus provides a plurality of light barriers which make it possible to pour the processing solutions into the container, or tank, and pour them out of the container in a dimly lighted room, without injury to the films.

The opaque walls of the retainer rack protect the films from the sides and the front and rear faces of the films.

The spacer holder, which is placed over the top of the retainer rack, covers the top of the retainer rack by an opaque wall which protects the films in that direction.

When the retainer rack and the spacer holder are placed in the container, or tank, the vertical walls and the bottom wall of the container, or tank protect the films from all directions except the top, which is already covered by the opaque top wall of the spacer holder.

The cover which fits over the top of the container or tank, completely encloses the container so that no light can reach either the solutions or the films, even if the container is stored in a lighted room. Thus the various components of the apparatus, in addition to their regular functions hereinbefore outlined, serve as light barriers to prevent the passage of light to the films.

Where the coils of the springs engage the side edges and the bottom of the film they tend to prevent the passage of the solutions to the film in the areas of the coils in actual contact with the individual film. This causes defects in the films, as the developing and other processing solutions are unable to reach the individual film in the covered areas. As the diameter of the springs is relatively small, a fine wire is used for winding the springs, and as the portion of the spring coils projecting beyond the inner surface of the walls of the retainer rack is relatively small, these defects are held to a minimum and therefore do not affect the exposed area of the film to any serious extent.

Figure 11:
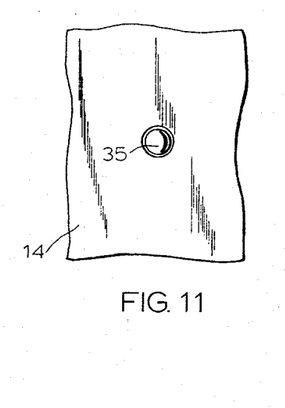
FIG. 11 is an enlarged rear elevational view of the rear wall of the film retainer rack, showing the method of supporting the tension spring within the channel in the rear wall of the retainer rack.

Spaced coils along the length of the individual springs are attached to the walls of the retainer rack in the manner shown in FIGS. 10 and 11, thus holding the springs in place within their respective channels and preventing the movement of the coils of the springs out of the channels in the respective walls of the retainer rack.

Ample spaces are provided around the various components supported within the container, or tank to allow the developing solution and other processing solutions to flow freely within the container, and reach all surfaces of the films supported by the retainer rack.

The retainer rack is approximately ½ inch shorter than the inner spacing between the left-hand end wall of the spacer holder and the spacer panel. The spacer holder is shorter than the inner spacing between the end walls of the container or tank. When the retainer rack, with the spacer holder fitted thereto is inserted in the container or tank, in the manner shown in FIG. 6, a relatively large area is provided at one end of the container to allow the solution to be poured into the container.

The spaces provided at both sides of the spacer panel, between the spacer panel and the front and rear walls of the spacer holder, allow the solutions to flow freely into the retainer rack, thus fully immersing the films within the developing solution, and the other processing solutions in the container or tank.

The bottom of the spacer panel is located above the bottom of the front and rear walls of the spacer holder, thus providing an additional area for the solutions to flow.

The bottom panel of the retainer rack is also narrower than the spacing between the front and rear walls of the retainer rack. This, coupled with the thickness of the bottom panel of the retainer rack, which provides spaces for the flow of the solutions, below the front and rear walls of the retainer rack and the end walls of the retainer rack, allow the solutions to flow freely along the retainer rack, thereby reaching all exposed surfaces of the films supported within the retainer rack without interference.

After the solution is poured into the container or tank, the container may be manually rocked by the operator, thus allowing any air pocketed in the solution to escape through the spaces between the spacer panel and the front and rear walls of the spacer holder, and out into the atmosphere.

In order to allow any additional air pocketed in the solution to escape, a plurality of small openings 66 is provided through the upper portion of the left-hand end wall of the spacer holder.

This allows air pocketed in the solution to flow through the openings and into the atmosphere.

When the solutions are poured out of the container, the same passages which allow the fluid to enter the retainer rack, allow the fluid to pass from the retainer rack, through the spaces in the spacer holder, into the area at the end of the container or tank, from which it can be poured out of the container, without disturbing the films which are supported by the retainer rack.

The bottom edges of the front and rear walls and the portion of the end walls of the retainer rack extending beyond the bottom panel, are located above the bottom of the bottom panel of the retainer rack, thus providing a continuous clear area for the flow of the various solutions to the individual films supported within the retainer rack, regardless of the location of the films relative to the front and rear walls of the retainer rack.

The solutions flow from these areas through the spaces at the bottom of the front and rear walls of the retainer rack and the bottom of the bottom panel of the retainer rack, thus enabling the solutions to reach all of the films supported by the retainer rack.

As the solutions are poured into the container or tank, they gradually rise in the areas between the individual films, until the films are completely submerged in the solutions.

Any air pocketed in the solutions escapes into the atmosphere in the manner hereinbefore described.

To assure that any air pocketed in the solution is allowed to escape, the container or tank may be rocked along its longitudinal axis, or jarred for a few seconds, thus allowing any air pocketed in the solution to escape into the atmosphere in the manner hereinbefore described.

It will be apparent to those skilled in the art that the present invention is not limited to the specific details described above and shown in the drawings, and that various modifications are possible in carrying out the features of the inventions and the operation, actuation, and method of assembly and utilization thereof, without departing from the spirit and scope of the appended claims.

What is claimed is:

1. An apparatus for retaining and processing relatively small X-ray films, comprising a retainer rack for supporting a plurality of films, said retainer rack including a front wall, a rear wall spacedly located relative to the front wall and substantially parallel thereto, a pair of end walls fixedly attached to the ends of the front and rear walls and substantially perpendicular thereto, and a bottom panel fixedly attached to the end walls and located between the front and rear walls, spring means fitted to inner surface of each of the front and rear walls and projecting inward therefrom, and auxiliary spring means fitted to the inner surface of the bottom panel and projecting upward therefrom, each of said spring means being operative to grip the adjacent edge of the films inserted therebetween, the films being substantially perpendicular to the front and rear walls of the retainer rack, means removably inserted between the front and rear walls of the retainer rack operative to spacedly locate the individual films relative to one another, the front and rear walls of the retainer rack, each has a longitudinal channel cut into the inner surface thereof, the bottom panel having a longitudinal channel cut into the upper surface thereof, the spring means being a coiled tension spring fitted to each of the longitudinal channels in the front and rear walls of the retainer rack, a portion of the outer circumferential surface of the spring projecting beyond the inner surface of the adjoining front and rear wall of the retainer rack, the auxiliary spring means being an auxiliary coiled tension spring fitted to the longitudinal channel in the bottom panel, a portion of the outer circumferential surface of the auxiliary spring projecting beyond the upper surface of the bottom panel, the means removably inserted between the front and rear walls of the retainer rack being a spacer panel, inserted adjacent the surface of one film in the retainer rack, to spacedly locate the next film in the retainer rack, the spacer panel being substantially perpendicular to the front and rear walls of the retainer rack, the width of the spacer panel being narrower than the spacing between the front and rear walls of the retainer rack, to provide gaps between the edges of the spacer panel and the front and rear walls of the retainer rack, respectively, the bottom of the spacer panel being located above the upper surface of the bottom panel of the retainer rack, a spacer holder supporting the spacer panel, the spacer holder including a front wall and a rear wall substantially parallel to one another, the spacing between the front and rear walls of the spacer holder being greater than the spacing between the outer surfaces of the front and rear walls of the retainer rack, and a top wall fixedly attached to the upper edge of the front and rear walls of the spacer holder, the spacer panel being fixedly attached to and suspended from one end of the top wall.

2. An apparatus for retaining and processing relatively small X-ray films, comprising a retainer rack for supporting a plurality of films, said retainer rack including a front wall, a rear wall spacedly located relative to the front wall and substantially parallel thereto, a pair of end walls fixedly attached to the ends of the front and rear walls and substantially perpendicular thereto, and a bottom panel fixedly attached to the end walls and located between the front and rear walls, spring means fitted to inner surface of each of the front and rear walls and projecting inward therefrom, and auxiliary spring means fitted to the inner surface of the bottom panel and projecting upward therefrom, each of said spring means being operative to grip the adjacent edge of the films inserted therebetween, the films being substantially perpendicular to the front and rear walls of the retainer rack, means removably inserted between the front and rear walls of the retainer rack operative to spacedly locate the individual films relative to one another, the front and rear walls of the retainer rack are made of an opaque sheet material, the front and rear walls each having a longitudinal channel cut into the inner surface thereof, the bottom panel having a longitudinal channel cut into the upper surface thereof, the spring means being a coiled tension spring fitted to each of the longitudinal channels in the front and rear walls of the retainer rack, a portion of the outer circumferential surface of each spring projecting beyond the adjoining surface of the front and rear wall of the retainer rack, the auxiliary spring means being an auxiliary coiled tension spring fitted to the longitudinal channel in the bottom panel, a portion of the outer circumferential surface of the auxiliary spring projecting beyond the upper surface of the bottom panel, the means inserted between the front and rear walls of the retainer rack being a spacer panel inserted adjacent the surface of one film in the retainer rack, the spacer panel being operative to locate the adjoining film in the retainer rack, the spacer panel being substantially perpendicular to the front and rear walls of the retainer rack, the width of the spacer panel being narrower than the spacing between the front and rear walls of the retainer rack, to provide gaps between the edges of the spacer panel and the front and rear wall of the retainer rack respectively, a spacer holder supporting the spacer panel, the spacer holder including a front wall and a rear wall, substantially parallel to one another, the spacing between the front and rear walls of the spacer holder being slightly greater than the spacing between the outer surfaces of the front and rear walls of the retainer rack, and a top wall fixedly attached to the upper edge of the front and rear walls of the spacer holder, the spacer panel being fixedly attached to and suspended from one end of the top wall of the spacer holder, the spacer panel, the front and rear walls, and the top wall of the spacer holder being made of an opaque sheet material.

3. An apparatus for retaining and processing dental X-ray films, comprising a retainer rack for supporting a plurality of dental X-ray films, said retainer rack including a front wall, a rear wall substantially parallel to the front wall, the spacing between the front and rear walls being slightly greater than the width of the individual X-ray films, a pair of end walls fixedly attached to the ends of the front and rear walls and substantially perpendicular thereto, and a bottom panel fixedly attached to the end walls and located between the front and rear walls, the bottom panel being substantially perpendicular to the front and rear walls, spring means fitted to the inner surface of the front and rear walls and projecting inward therefrom, and auxiliary spring means fitted to the upper surface of the bottom panel and projecting upward therefrom, each of the spring means being operative to engage and grip the adjacent edges of the films inserted therebetween, the films being substantially perpendicular to the front and rear walls of the retainer rack, means removably inserted between the front and rear walls of the retainer rack, operative to spacedly locate the films relative to one another, the front and rear walls of the retainer rack, each has a longitudinal channel cut into the inner surface thereof, the bottom panel having a channel cut into the upper surface thereof, the spring means being a coiled tension spring fitted to each of the longitudinal channels in the front and rear walls of the retainer rack, a portion of the circumferential outer surface of each spring projecting beyond the inner surface of the adjacent front and rear wall of the retainer rack, the auxiliary spring means being an auxiliary coiled tension spring fitted to the longitudinal channel in the bottom panel, a portion of the outer circumferential surface of the spring projecting beyond the upper surface of the bottom panel, the means removably inserted between the front and rear walls of the retainer rack being a spacer panel inserted adjacent the surface of one film in the retainer rack, to spacedly locate the next film in the retainer rack, the spacer panel being substantially perpendicular to the front and rear walls of the retainer rack, the width of the spacer panel being narrower than the spacing between the front and rear walls of the retainer rack to provide gaps between the sides of the spacer panel and the front and rear walls of the retainer rack, respectively, the bottom of the spacer panel being located above the upper surface of the bottom panel of the retainer rack, a spacer holder supporting the spacer panel, the spacer holder including a front wall and a rear wall, substantially parallel to one another, the spacing between the front and rear walls of the spacer holder being greater than the spacing between the outer surfaces of the front and rear walls of the retainer rack, a top wall fixedly attached to the upper edge of the front and rear walls of the spacer holder, the spacer panel being fixedly attached to and suspended from one end of the top wall, and an end wall fixedly attached to the end of the front wall, the rear wall and the top wall of the spacer holder, opposite the spacer panel, the spacing between the end wall and the spacer panel being greater than the spacing between the end walls of the retainer rack, and a container operative to receive and support the retainer rack and the spacer holder, the container including a front wall and a rear wall substantially parallel to one another, the spacing between the front and rear walls of the container being greater than the spacing between the outer surfaces of the front and rear walls of the spacer holder, a pair of end walls fixedly attached to the ends of the front and rear walls of the container the end walls being substantially perpendicular to the front and rear walls of the container, the spacing between the end walls being greater than the overall spacing between one end wall of the retainer rack, and the end wall of the spacer holder, and a bottom wall fixedly attached to the front and rear walls and the end walls of the container, the joints between the front walls, the rear wall, the end walls, and the bottom wall of the container being substantially leak proof, the container being filled with a film processing solution to process the films supported by the retainer rack, the height of the processing solution being greater than the height of the films in the retainer rack to completely immerse the films in the processing solution.

4. An apparatus for retaining and processing dental X-ray films, comprising a retainer rack for supporting a plurality of dental X-ray films, said retainer rack including a front wall, a rear wall substantially parallel to the front wall, the spacing between the front and rear walls being slightly greater than the width of the individual X-ray films, a pair of end walls fixedly attached to the ends of the front and rear walls and substantially perpendicular thereto, and a bottom panel fixedly attached to the end walls and located between the front and rear walls, the bottom panel being substantially perpendicular to the front and rear walls, spring means fitted to the inner surface of the front and rear walls and projecting inward therefrom, and auxiliary spring means fitted to the upper surface of the bottom panel and projecting upward therefrom, each of the spring means being operative to engage and grip the adjacent edges of the films inserted therebetween, the films being substantially perpendicular to the front and rear walls of the retainer rack, means removably inserted between the front and rear walls of the retainer rack, operative to spacedly locate the films relative to one another, the front and rear walls of the retainer rack, each has a longitudinal channel cut into the inner surface thereof, the bottom panel having a longitudinal channel cut into the upper surface thereof, the front and rear walls and the end walls of the retainer rack being made of an opaque sheet material, the spring means being a coiled tension spring fitted to each of the longitudinal channels in the front and rear walls of the retainer rack, a portion of the circumferential outer surface of each spring projecting beyond the inner surface of the adjacent front and rear wall of the retainer rack, the auxiliary spring means being an auxiliary coiled tension spring fitted to the longitudinal channel in the bottom panel, a portion of the circumferential outer surface of the spring projecting beyond the upper surface of the bottom panel, the means removably inserted between the front and rear walls of the retainer rack being a spacer panel inserted adjacent the surface of one film in the retainer rack, to spacedly locate the next film in the retainer rack, the spacer panel being substantially perpendicular to the front and rear walls of the retainer rack, the width of the spacer panel being narrower than the spacing between the front and rear walls of the retainer rack to provide gaps between the spacer panel and the front and rear walls of the retainer rack, respectively, a spacer holder supporting the spacer panel, the spacer holder including a front wall and a rear wall, substantially parallel to one another, the spacing between the front and rear walls of the spacer holder being greater than the spacing between the outer surfaces of the front and rear walls of the retainer rack, a top wall fixedly attached to the upper edge of the front and rear walls of the spacer holder, the spacer panel being fixedly attached to and suspended from one end of the top wall of the spacer holder, and an end wall fixedly attached to the end of the front wall, the rear wall and the top wall of the spacer holder, opposite the spacer panel, the spacing between the end wall and the spacer panel being greater than the spacing between the outer surfaces of the end walls of the retainer rack, the front wall, the rear wall, the end wall of the spacer holder and the spacer panel being made of an opaque sheet material, and a container operative to receive and support the retainer rack and the spacer holder, the container including a front wall, and a rear wall substantially parallel to one another, the spacing between the front and rear walls of the container being greater than the spacing between the outer surfaces of the front and rear walls of the spacer holder, a pair of end walls fixedly attached to the ends of the front and rear walls of the container, the end walls being substantially perpendicular to the front and rear walls of the container, the spacing between the end walls being greater than the overall spacing between one end wall of the retainer rack and the end wall of the spacer holder, when the spacer panel is inserted in the retainer rack, to allow the retainer rack and the spacer holder to be inserted into the interior of the container, and a bottom wall fixedly attached to the front and rear walls and the end wall of the container, the front and rear walls and the end walls of the container being made of an opaque sheet material, the joints between the front wall, the rear wall, the end walls and the bottom wall of the container being substantially leak proof, the container being filled with a film processing solution to process the films supported by the retainer rack, the height of the processing solution in the container being greater than the height of the films in the retainer rack to allow the films to be completely immersed in the processing solution.

5. An apparatus for retaining and processing dental X-ray films, comprising a retainer rack for supporting a plurality of dental X-ray films, said retainer rack including a front wall, a rear wall substantially parallel to the front wall, the spacing between the front and rear walls being slightly greater than the width of the individual X-ray films, a pair of end walls fixedly attached to the ends of the front and rear walls and substantially perpendicular thereto, and a bottom panel fixedly attached to the end walls and located between the front and rear walls, the bottom panel being substantially perpendicular to the front and rear walls, spring means fitted to the inner surface of the front and rear walls and projecting inward therefrom, and auxiliary spring means fitted to the upper surface of the bottom panel and projecting upward therefrom, each of the spring means being operative to engage and grip the adjacent edges of the films inserted therebetween, the films being substantially perpendicular to the front and rear walls of the retainer rack, means removably inserted between the front and rear walls of the retainer rack, operative to spacedly locate the films relative to one another, the front and rear walls of the retainer rack, each has a longitudinal channel cut into the inner surface thereof, the bottom panel having a longitudinal channel cut into the upper surface thereof, the front and rear walls and the end walls of the retainer rack being made of an opaque sheet material, the spring means being a coiled tension spring fitted to each of the longitudinal channels in the front and rear walls of the retainer rack, a portion of the circumferential outer surface of each spring projecting beyond the inner surface of the adjacent front and rear wall of the retainer rack, the auxiliary spring means being an auxiliary coiled tension spring fitted to the longitudinal channel in the bottom panel of the retainer rack, a portion of the circumferential outer surface of the spring projecting beyond the upper surface of the bottom panel, the means removably inserted between the front and rear walls of the retainer rack being a spacer panel inserted adjacent the surface of one film in the retainer rack, to spacedly locate the next film in the retainer rack, the spacer panel being substantially perpendicular to the front and rear walls of the retainer rack, a spacer holder supporting the spacer panel, the spacer holder including a front wall and a rear wall substantially parallel to one another, the spacing between the front and rear walls of the spacer holder being greater than the spacing between the outer surfaces of the front and rear walls of the retainer rack, the spacer panel being fixedly attached to and suspended from one end of the top wall of the spacer holder, and an end wall fixedly attached to the end of the front wall, the rear wall and the top wall of the spacer holder, opposite the spacer panel, the spacing between the end wall and the spacer panel being greater than the spacing between the outer surfaces of the end walls of the retainer rack, the front wall, the rear wall, the end wall of the spacer holder, and the spacer panel being made of an opaque sheet material, and a hollow container operative to support the retainer rack and the spacer holder, the container including a front wall and a rear wall substantially parallel to one another, the spacing between the front and rear walls of the container being greater than the spacing between the outer surfaces of the front and rear walls of the spacer holder, a pair of end walls fixedly attached to the ends of the front and rear walls of the container, the end walls being substantially perpendicular to the front and rear walls of the container, the spacing between the end walls being greater than the overall-spacing between one end wall of the retainer rack and the end wall of the spacer holder, when the spacer panel is inserted in the retainer rack, and a bottom wall fixedly attached to the bottom of the front and rear walls and the end walls of the container, the front and rear walls, the end walls and the bottom wall of the container being made of an opaque sheet material, the joints between the front wall, the rear wall, the end walls and the bottom wall of the container being substantially leak proof, the container being filled with a film processing solution, to process the films supported by the retainer rack, the depth of the processing solution in the container being greater than the height of the films in the retainer rack to allow the films to be completely immersed in the processing solution, and a cover mounted above the open upper end of the container, the cover including a front wall and a rear wall, substantially parallel to one another, the spacing between the front and rear walls of the cover being slightly greater than the spacing between the outer surfaces of the front and rear walls of the container, a pair of end walls fixedly attached to the ends of the front and rear walls of the cover, the end walls being substantially perpendicular to the front and rear walls, the spacing between the end walls of the cover being slightly greater than the spacing between the outer surfaces of the end walls of the container, and a top wall fixedly attached to the front wall, the rear wall and the end walls of the cover, the front wall, the rear wall, the end walls and the top wall of the cover being made of an opaque sheet material, to allow the container, with the cover fitted thereto to be located in a lighted room, the films being protected from exposure to the light, during the processing thereof.

6. An apparatus for retaining and processing dental X-ray films, comprising a retainer rack for supporting a plurality of dental X-ray films, said retainer rack including a front wall, a rear wall substantially parallel to the front wall, the spacing between the front and rear walls being slightly greater than the width of the individual X-ray films, a pair of end walls fixedly attached to the ends of the front and rear walls and substantially perpendicular thereto, and a bottom panel fixedly attached to the end walls and located between the front and rear walls, the bottom panel being substantially perpendicular to the front and rear walls, spring means fitted to the inner surface of the front and rear walls and projecting inward therefrom, and auxiliary spring means fitted to the upper surface of the bottom panel and projecting upward therefrom, each of the spring means being operative to engage and grip the adjacent edges of the films inserted therebetween, the films being substantially perpendicular to the front and rear walls of the retainer rack, means removably inserted between the front and rear walls of the retainer rack, operative to spacedly locate the films relative to one another, the front and rear walls, each has a longitudinal channel cut into the inner surface thereof, the bottom panel having a longitudinal channel cut into the upper surface thereof, the spring means being a coiled tension spring fitted to each of the longitudinal channels in the front and rear walls of the retainer rack, each of the springs being formed of a plurality of closely wound coils of fine wire, a portion of the circumferential outer surface of the coils projecting beyond the surface of the adjoining front and rear wall of the retainer rack, a spring end integral with each of the end coils of the spring and projecting outward therefrom, the auxiliary spring means being an auxiliary coiled tension spring fitted to the longitudinal channel in the bottom panel, the auxiliary spring being formed of a plurality of closely wound coils of fine wire, a portion of the circumferential outer surface of the coils projecting beyond the upper surface of the bottom panel, a spring end integral with each end coil of the auxiliary spring and projecting outward therefrom, each end wall of the retainer rack having an opening therethrough in substantial alignment with the corresponding end of each of the tension springs and the auxiliary spring respectively, the first spring end of each of the coiled tension springs being inserted through the aligned opening in the corresponding end wall of the retainer rack, means attaching the first end of the tension spring to the adjacent end wall of the retainer rack, the second spring end of each of the coiled tension springs being inserted through the aligned opening in the corresponding end wall of the retainer rack, means attaching the second end of the tension spring to the adjacent end wall of the retainer rack after the tension spring is adjusted to the predetermined tension to enable adjoining coils of the spring to grip one of the films inserted therebetween, the first end of each of the auxiliary springs being inserted through the aligned opening in the corresponding end wall of the retainer rack, means attaching the first end of the auxiliary spring to the adjacent end wall of the retainer rack, the second spring end of each of the auxiliary springs being inserted through the aligned opening in the corresponding end wall of the retainer rack, and means attaching the second end of the auxiliary spring to the adjacent end wall of the retainer rack after the auxiliary spring is adjusted to the predetermined tension, to enable adjoining coils of the auxiliary spring to grip the adjacent edge of one of the films inserted therebetween.

7. An apparatus for retaining and processing dental X-ray films, comprising a retainer rack for supporting a plurality of dental X-ray films, said retainer rack including a front wall, a rear wall substantially parallel to the front wall, the spacing between the front and rear walls being slightly greater than the width of the individual X-ray films, a pair of end walls fixedly attached to the ends of the front and rear walls and substantially perpendicular thereto, and a bottom panel fixedly attached to the end walls and located between the front and rear walls, the bottom panel being substantially perpendicular to the front and rear walls, spring means fitted to the inner surface of the front and rear walls and projecting inward therefrom, and auxiliary spring means fitted to the upper surface of the bottom panel and projecting upward therefrom, each of the spring means being operative to engage and grip the adjacent edges of the films inserted therebetween, the films being substantially perpendicular to the front and rear walls of the retainer rack, means removably inserted between the front and rear walls of the retainer rack, operative to spacedly locate the films relative to one another, the front and rear walls of the retainer rack, each has a longitudinal channel cut into the inner surface thereof, the bottom panel having a longitudinal channel cut into the upper surface thereof, the spring means being a coiled tension spring fitted to each of the longitudinal channels in the front and rear wall of the retainer rack, a portion of the circumferential outer surface of the coils of each spring projecting beyond the inner surface of the adjacent front and rear wall of the retainer rack, a spring end integral with each of the end coils of the tension spring and projecting outward therefrom, the auxiliary spring means being an auxiliary coiled tension spring fitted to the longitudinal channel in the bottom panel of the retainer rack, the auxiliary spring being formed of a plurality of closely wound coils of relatively fine wire, a portion of the circumferential outer surface of the coils projecting beyond the upper surface of the bottom panel, a spring end integral with each end coil of the auxiliary spring and projecting outward therefrom, each end wall of the retainer rack having an opening therethrough in substantial alignment with the corresponding end of each of the tension springs and the auxiliary spring, respectively, the ends of the coiled tension springs, and the auxiliary springs being inserted through the aligned openings in the corresponding end walls of the retainer rack, means attaching one end of each of the coiled tension springs and the auxiliary spring to the adjacent end wall of the retainer rack, and means attaching the opposite end of each of the coiled tension springs and the auxiliary spring to the corresponding end wall of the retainer rack, after each of the tension springs and the auxiliary tension spring are adjusted to the required tension to enable adjoining coils of each of the springs to grip one edge of one of the films inserted therebetween in the retainer rack.

8. An apparatus for retaining and processing dental X-ray films, comprising a retainer rack for supporting a plurality of dental X-ray films, said retainer rack including a front wall, a rear wall substantially parallel to the front wall, the spacing between the front and rear walls being slightly greater than the width of the individually X-ray films, a pair of end walls fixedly attached to the ends of the front and rear walls and substantially perpenducualr thereto, and a bottom panel fixedly attached to the end walls and located between the front and rear walls, the bottom panel being substantially perpendicular to the front and rear walls, spring means fitted to the inner surface of the front and rear walls and projecting inward therefrom, and auxiliary spring means fitted to the upper surface of the bottom panel and projecting upward therefrom, each of the spring means being operative to engage and grip the adjacent edges of the films inserted therebetween, the films being substantially perpendicular to the front and rear walls of the retainer rack, means removably inserted between the front and rear walls of the retainer rack, operative to spacedly locate the films relative to one another, the front and rear walls of the retainer rack, each has a longitudinal channel cut into the inner surface thereof, the bottom panel having a longitudinal channel cut into the upper surface thereof, the spring means being a coiled tension spring fitted to the longitudinal channels in the front and rear walls of the retainer rack, respectively, each of the springs being formed of a plurality of closely wound coils of relatively fine wire, a portion of the circumferential outer surface of the coils projecting beyond the inner surface of the adjoining front and rear wall of the retainer rack, means attaching the ends of each tension spring to the adjacent end wall of the retainer rack, the auxiliary spring means being an auxiliary coiled tension spring fitted to the longitudinal channel in the bottom panel, the auxiliary spring being formed of a plurality of closely wound coils of relatively fine wire, a portion of the circumferential outer surface of the coils projecting beyond the upper surface of the bottom panel, means attaching the ends of the auxiliary spring to the adjoining end wall of the retainer rack, the front and rear walls of the retainer rack, each having a plurality of spaced openings therethrough in substantial alignment with spaced coils of the spring fitted to the respective wall, and means inserted through each of said openings operative to attach the selected coil of the tension spring to the corresponding wall of the retainer rack, the bottom panel of the retainer rack having a plurality of spaced openings therethrough in substantial alignment with spaced coils of the auxiliary spring fitted to the bottom panel, and means inserted through each of said openings operative to attach the selected coils of the auxiliary spring to the bottom panel of the retainer rack.

References Cited by the Examiner

UNITED STATES PATENTS

| 662,167 | 11/1900 | Crissy et al. | 95—98 |
| 1,487,942 | 3/1924 | Hines et al. | 211—41 |
| 3,094,129 | 6/1963 | Wills | 211—40 |

FOREIGN PATENTS

| 249,697 | 4/1926 | Great Britain. |
| 574,026 | 3/1958 | Italy. |

NORTON ANSHER, *Primary Examiner.*

CLIFFORD B. PRICE, *Assistant Examiner.*